(12) United States Patent
Dalrymple (10) Patent No.: US 9,723,811 B2
(45) Date of Patent: Aug. 8, 2017

(54) TROUGH

(76) Inventor: Roger Kenneth Roy Dalrymple, Bulls (NZ)

(*) Notice: Subject to any disclaimer, the term of this patent is extended or adjusted under 35 U.S.C. 154(b) by 455 days.

(21) Appl. No.: 14/125,864

(22) PCT Filed: Jun. 14, 2012

(86) PCT No.: PCT/NZ2012/000097
§ 371 (c)(1),
(2), (4) Date: Jun. 17, 2014

(87) PCT Pub. No.: WO2012/173499
PCT Pub. Date: Dec. 20, 2012

(65) Prior Publication Data
US 2014/0299063 A1    Oct. 9, 2014

(30) Foreign Application Priority Data
Jun. 14, 2011 (NZ) .......................... 593453

(51) Int. Cl.
*A01K 5/01* (2006.01)

(52) U.S. Cl.
CPC ...................... *A01K 5/01* (2013.01)

(58) Field of Classification Search
CPC ........................................ A01K 5/01
USPC .............. 119/61.1, 52.1, 58, 51.01
See application file for complete search history.

(56) References Cited

U.S. PATENT DOCUMENTS

| 35,259 A | * | 5/1862 | Ralston | ................ A01K 1/0041 |
| | | | | 119/515 |
| 159,601 A | * | 2/1875 | Mitchell | ................. A01K 5/01 |
| | | | | 119/58 |
| 177,178 A | | 5/1876 | Walton et al. | |
| 261,842 A | * | 8/1882 | French | ..................... A01K 5/01 |
| | | | | 119/63 |

(Continued)

FOREIGN PATENT DOCUMENTS

| AU | 598598 | 6/1990 |
| AU | 2004100920 A5 | 11/2004 |

(Continued)

OTHER PUBLICATIONS

International Search Report and Written Opinion dated Dec. 11, 2012, issued in PCT Application No. PCT/NZ2012/000097, filed Jun. 14, 2012.

(Continued)

*Primary Examiner* — Marc Burgess
*Assistant Examiner* — Morgan T Barlow
(74) *Attorney, Agent, or Firm* — Workman Nydegger (57) ABSTRACT

A freestanding trough has an elongate trough body 12 and transverse restraints 14. The trough body has a bottom portion 16 integrally formed with two side wall portions 18 from a resilient semi-rigid sheet. The restraints 14 extends transversely across the inside of the trough, intermediate the ends of the trough body 23, lower than upper edges of the side wall portions but higher than the bottom portion. The side wall portions 18 are restrained from moving outward, away from a longitudinal centerline of the trough, at least in (Continued)

part by a tension in the restraint 14 and the side wall portions are maintained upright in part by the tension in the restraint, and in part by the resilient semi-rigidity of the sheet.

30 Claims, 4 Drawing Sheets

(56) References Cited

U.S. PATENT DOCUMENTS

| | | | | |
|---|---|---|---|---|
| 391,580 A | * | 10/1888 | Burton | A01K 5/01 119/61.1 |
| 422,007 A | | 2/1890 | Burton | |
| 471,868 A | * | 3/1892 | Leech | A01K 5/01 119/63 |
| 489,808 A | * | 1/1893 | Higgins | A01K 5/01 119/63 |
| 514,203 A | * | 2/1894 | Schmidt | A01K 5/01 119/61.1 |
| 525,459 A | | 9/1894 | Hill | |
| 577,631 A | * | 2/1897 | Stacy | A01K 5/01 119/61.1 |
| 654,427 A | * | 7/1900 | Atsatt | A01K 5/01 119/61.4 |
| 678,104 A | | 7/1901 | Glidden | |
| 700,522 A | * | 5/1902 | Maginnis | A01K 5/01 119/61.1 |
| 715,478 A | * | 12/1902 | Helmick | A01K 5/01 119/63 |
| 737,789 A | * | 9/1903 | Sprow | A01K 5/01 119/63 |
| 755,753 A | * | 3/1904 | Davis | A01K 5/01 119/63 |
| 786,674 A | * | 4/1905 | Polski | B65D 1/165 220/4.01 |
| 795,484 A | * | 7/1905 | Coble | B65D 25/24 119/61.1 |
| 809,958 A | * | 1/1906 | Kennedy | B65D 90/08 119/61.1 |
| 822,763 A | * | 6/1906 | Paulus | A01K 5/01 119/61.1 |
| 906,396 A | * | 12/1908 | Drake et al. | A01K 5/01 119/61.1 |
| 1,076,724 A | * | 10/1913 | Ventress | A01K 5/01 119/61.1 |
| 1,126,907 A | * | 2/1915 | Stocking | A01K 5/01 119/61.1 |
| 1,198,238 A | * | 9/1916 | Klein et al. | A01K 5/01 119/61.1 |
| 1,213,053 A | * | 1/1917 | Wooldridge | A01K 5/01 119/61.4 |
| 1,252,521 A | * | 1/1918 | Weaver | A01K 5/01 119/61.1 |
| 1,405,568 A | * | 2/1922 | Conklin | A47H 27/00 220/4.12 |
| 1,407,404 A | * | 2/1922 | Gibbons | A01K 5/01 119/61.1 |
| 1,418,516 A | * | 6/1922 | Bayne | A01K 5/01 119/61.1 |
| 1,423,552 A | | 7/1922 | Bayne | |
| 1,424,371 A | * | 8/1922 | Naylor | A01K 5/01 119/61.1 |
| 1,432,051 A | * | 10/1922 | Burrell | A01K 5/01 119/61.1 |
| 1,727,610 A | | 9/1929 | Kramer | |
| 2,280,537 A | * | 4/1942 | Emanuel | A01K 5/01 119/61.1 |
| 2,448,707 A | * | 9/1948 | Erickson | A01K 5/01 119/61.31 |
| 2,501,980 A | * | 3/1950 | Wolfe | A01K 1/10 220/4.33 |
| 2,583,874 A | * | 1/1952 | Niemann | A01K 39/014 119/51.01 |
| 2,625,289 A | * | 1/1953 | Murphy | A01K 7/025 119/61.1 |
| 3,092,007 A | | 6/1963 | Smoker et al. | |
| 3,092,077 A | | 6/1963 | Smoker et al. | |
| 3,121,418 A | * | 2/1964 | Stone | A01K 5/01 119/61.1 |
| 3,198,174 A | * | 8/1965 | Gilmore | A01K 5/01 119/61.1 |
| 3,972,307 A | * | 8/1976 | Marseillan | A01K 3/00 119/502 |
| 4,779,570 A | * | 10/1988 | Pereda | A01K 1/0005 119/502 |
| 4,793,289 A | | 12/1988 | Peeso | |
| 4,825,588 A | * | 5/1989 | Norman | A01G 9/02 119/61.1 |
| 4,915,060 A | | 4/1990 | Kling et al. | |
| 5,195,455 A | * | 3/1993 | van der Lely | A01K 1/01 119/14.03 |
| 5,554,248 A | * | 9/1996 | Payne | A01K 1/10 119/51.01 |
| 2008/0115731 A1 | * | 5/2008 | Walker | A01K 1/105 119/58 |
| 2009/0199774 A1 | | 8/2009 | Hamilton | |
| 2011/0120380 A1 | * | 5/2011 | Sladkowski | A01K 5/01 119/51.11 |
| 2011/0253053 A1 | * | 10/2011 | Kurtz | A01K 5/01 119/60 |
| 2014/0299063 A1 | | 10/2014 | Dalrymple | |

FOREIGN PATENT DOCUMENTS

| | | |
|---|---|---|
| GB | 142282 A | 5/1920 |
| GB | 1 363 891 | 8/1974 |
| GB | 1 501 872 | 2/1978 |
| GB | 1 542 250 | 3/1979 |
| GB | 2021378 A | 12/1979 |
| WO | 2011/016735 A1 | 2/2011 |

OTHER PUBLICATIONS

International Preliminary Report on Patentability dated Aug. 8, 2013, issued in PCT Application No. PCT/NZ2012/000097, filed Jun. 14, 2012.

Written Opinion dated May 14, 2013, issued in PCT Application No. PCT/NZ2012/000097, filed Jun. 14, 2012.

* cited by examiner

TROUGH

FIELD OF INVENTION

The present invention relates to a freestanding trough and in particular to a mobile freestanding trough from which farm animals can feed. The trough is open-topped and is suited for containment of feed materials for feeding out simultaneously to a number of animals, for example sheep or cattle. The trough is mobile or portable, and can be towed from site to site, for example by a farm animal or vehicle. The trough may be advantageously used in conjunction with one or more overhead electrified wires to reduce contamination and wastage of the feed material by deterring animals from walking or encroaching into or onto the trough. The trough can be used for feeding out wet or dry feed materials.

BACKGROUND

Many animal feeding systems are known. Dry feed material can be distributed directly onto the ground or floor but significant wastage can occur from trampling and soiling by the animals. Containment of feed in troughs, or other feed receptacles, reduces wastage and spoilage by the animals.

Where large numbers of animals are grouped together, shy feeders can be disadvantaged by not getting access to the feed material until the more dominant animals are sated, leaving less desirable or even insufficient feed remaining. Troughs can be used to address this problem by improving access to feed for large numbers of animals. Troughs provide a relatively large perimeter length compared to the volume of contained feed.

When used outdoors, particularly in wet conditions, the ground surrounding troughs can become damaged by excessive trampling and soiling by the stock feeding at the trough. Mobile troughs can be readily successively relocated to fresh feeding sites to reduce or avoid excessive damage of outdoor feed sites. Mobile troughs used indoors can be moved to facilitate cleaning of floor at feeding sites.

SUMMARY OF INVENTION

An object of at least one embodiment of the invention is to provide a trough for containing feed material, or at least to provide the public with a useful choice.

The invention may be broadly said to be a freestanding trough comprising an elongate trough body and at least one restraint, wherein:

the trough body comprises a bottom portion and two side wall portions;

the bottom portion is integrally formed with the two side wall portions from a resilient semi-rigid sheet;

the restraint extends transversely across the inside of the trough, intermediate the ends of the trough body, lower than upper edges of the side wall portions but higher than the bottom portion;

the side wall portions are secured respectively to opposite ends of the restraint;

the side wall portions are restrained from moving outward, away from a longitudinal centreline of the trough, at least in part by a tension in the restraint;

the side wall portions are maintained upright in part by the tension in the restraint, and in part by the resilient semi-rigidity of the sheet; and the trough body and restraint are arranged such that the trough can rest in a stable upright orientation without being attached or tethered to an underlying floor surface on which the trough rests.

Preferably, the trough comprises a foot at one end of the trough body, the foot extending outwardly from the longitudinal centreline, at each side of the trough. The foot may comprise a flat plate which extends under the one end of the trough body. The one end may be a front end of the trough body, and the foot comprises an extension which extends upwardly and forwardly from a front edge of the flat plate. The extension may extend upwardly and outwardly from opposite side edges of the flat plate.

Preferably, the trough comprises at least one reinforcing rib which is attached to the foot and to at least one of the side wall portions. The rib may extend across the bottom portion and up to the upper edge of each side wall portion.

Preferably, the trough comprises at least one leg attached to each of the longitudinal sides of the trough, the legs being intermediate the ends of the trough.

Preferably, the bottom portion is substantially flat. A skid plate may extend upwardly and forwardly from a front end of the substantially flat bottom portion. The skid plate may be supported by two flanges that are respectively attached to the side wall portions of the trough body. The skid plate and flanges may be formed integrally with the trough body from the resilient semi-rigid sheet.

Preferably, the trough comprises a line that extends longitudinally of the trough, from above one end of the trough body to above the other end of the trough body. The line may be electrically conductive and insulated from other parts of the trough. The line may be supported at its ends by suspension from uprights at each end of the trough body. The line and the uprights may be electrically conductive and insulated from other parts of the trough.

Preferably, the trough comprises an end wall at each end of the trough body. The uprights may be supported respectively by the ends walls. Each end wall may be sealed to the bottom portion and two side wall portions.

Preferably, the sheet is provided with lines of weakness about which the sheet preferentially bends when the side wall portions are made non-planar with the bottom portion to form the trough body. The sheet may be creased to provide the lines of weakness. The sheet may be provided with perforations along the lines of weakness.

Preferably, the trough comprises at least one reinforcing rib, intermediate the ends of the trough, the rib extending across the bottom portion and at least part way up each side wall portion. The rib may extend across the bottom portion and up to the upper edge of each side wall portion.

Preferably, the restraint comprises a wire. Preferably, the restraint is elongate. The ends of the restraint may be shackled respectively to the side wall portions.

Preferably, each side wall portion has perforations which are distributed along the length of the trough, the perforations being lower titan upper edges of the side wall portions but higher than the bottom portion; the perforations in one side wall portion are respectively aligned transversely across the trough with corresponding perforations in the opposite side wall portion; and a plurality of restraints is located substantially inside the trough with opposite ends of each restraint connecting respectively to the side wall portions at the transversely aligned perforations.

Preferably, the sheet is made of a plastics material. The plastics material may be a polypropylene. Preferably, the sheet has a thickness of at least 4 mm.

The invention may further be said to consist in any alternative combination of parts or features mentioned herein or shown in the accompanying drawings. Known equivalents of these parts or features which are not expressly set out are nevertheless deemed to be included.

The term 'comprising' as used in this specification, or in the accompanying claims, means 'consisting at least in part of'. When interpreting each statement in this specification, or in the accompanying claims, that includes the term 'comprising', features other than that or those prefaced by the term may also be present. Related terms such as 'comprise' and 'comprises' are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "(s)" following a noun means the plural and/or singular form of that noun.

As used herein the term "and/or" means "and" or "or", or where the context allows both.

The invention consists in the foregoing and also envisages constructions of which the following gives examples only.

BRIEF DESCRIPTION OF THE DRAWINGS

Preferred embodiments and methods of utilising the invention will be further described, with reference to the accompanying figures, by way of example only and without intending to be limiting, wherein.

DETAILED DESCRIPTION OF PREFERRED EMBODIMENTS

Referring to the figures it will be appreciated that the invention may be implemented in various forms and modes. The following description of preferred embodiments of the invention is given by way of example only.

Figure 1:
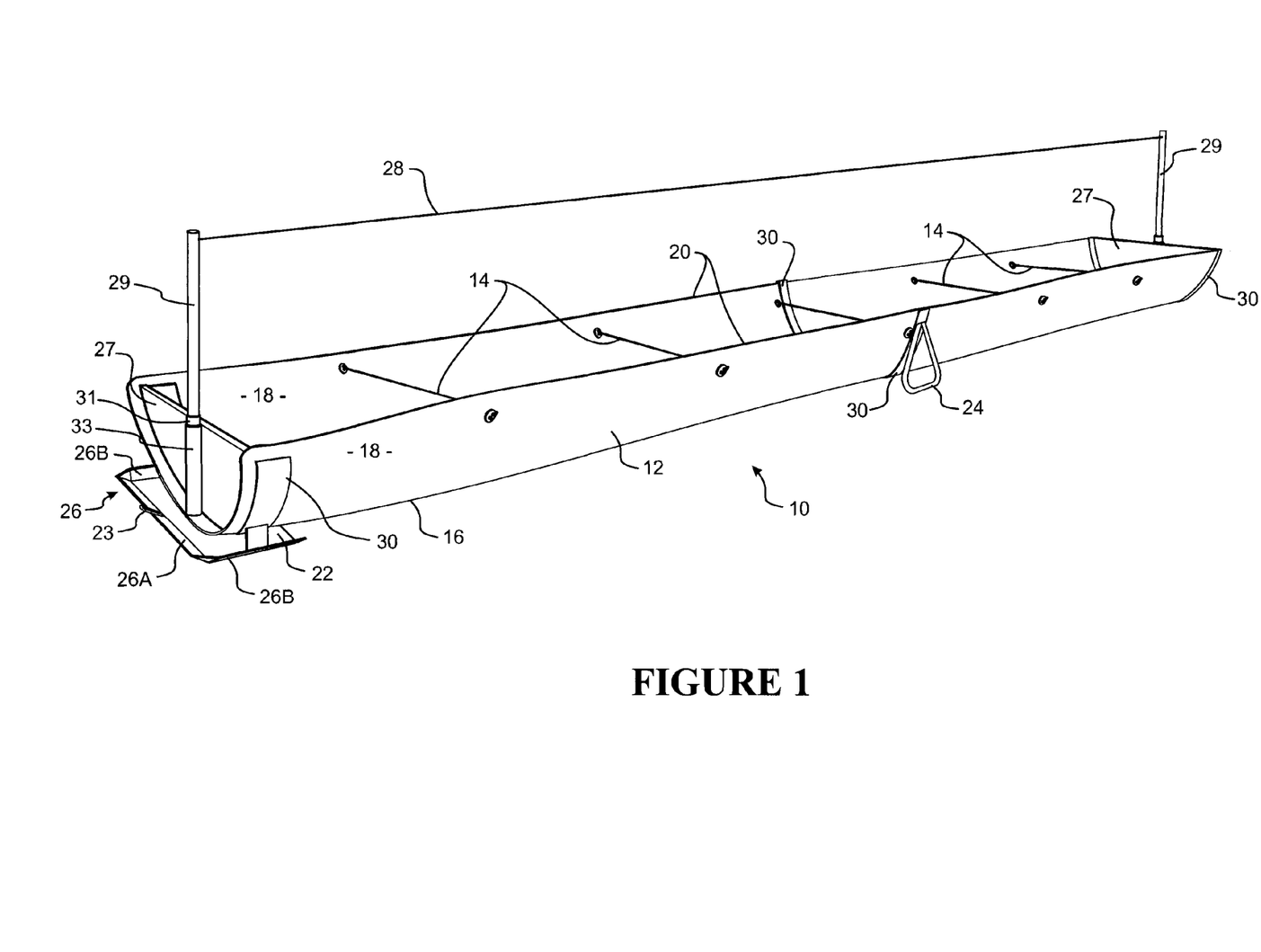
FIG. 1 shows a perspective view of a first embodiment of a trough according to the present invention.

FIG. 1 shows a perspective view of part of a first embodiment of a mobile freestanding trough 10. In use the trough is placed on the ground, for example outside in a paddock, or alternatively indoors on a floor surface, for example in a barn. The trough is freestanding, i.e. it can rest in a stable upright orientation without being attached or tethered to an underlying floor or ground surface on which it rests or without support from other objects. The trough is portable or mobile, i.e. it can be readily moved from one location to another, for example by towing or dragging behind a tractor vehicle across the floor or ground surface.

The trough is elongate and comprises an elongate trough body 12, and transverse restraints 14 which are distributed along the length of the trough.

The trough body comprises a floor or bottom portion and two side wall portions. The floor or bottom portion and the two side wall portions are integrally formed from a resilient semi-rigid sheet. The floor or bottom portion forms the floor or bottom 16 of the trough. The wall portions form the two trough side walls 18 which extend respectively along opposite longitudinal sides of the trough.

Each restraint 14 extends transversely across the inside of the trough, intermediate ends of the trough body. Each restraint is lower than upper edges 20 of the side walls 18 but higher than the bottom or floor 16.

The side walls 18 are restrained from moving outward, away from a longitudinal centreline of the trough, at least in part by tension in the restraints. The side walls 18 are maintained upright, in part by the tension in the restraints 14, and in part by the resilient semi-rigidity of the sheet.

The embodiment shown in FIG. 1 includes supports in the form of a front end foot plate 22 and side legs 24. These supports are located, or extend, outwardly from one or both sides of the longitudinal centreline of the trough, for maintaining the freestanding trough upright.

The front end foot plate 22 is a flat plate which extends under the front end of the trough and outwardly from each side of the trough. The flat plate has an extension 26. One portion 26A of the extension extends upwardly and forwardly from a front edge of the flat plate. Other portions 26B of the extension extend upwardly and outwardly from opposite side edges of the flat plate. The foot plate has an aperture or towing eye 23 for connection of a towing chain or line (not shown) to the trough for towing the trough, for example by a farm bike or tractor (not shown). The foot plate may be fabricated from steel or a plastics material, or may be moulded from a plastics material.

The side legs 24 are located at either side of the trough body. The side legs 24 are attached to the trough side walls 18, and extend downwards, and optionally outwards, to stabilise the trough in an upright orientation. A ground-engaging runner at the bottom of each leg has an upward tilt, at least at its leading end, to facilitate the sliding of the leg over ground terrain when the trough is being moved. The side legs are preferably provided as pairs of legs that are transversely aligned with one another at respective opposite sides of the trough. The side legs may be made from a shaped steel tube.

The trough has a transverse end wall 27 at each end of the trough body. Each end wall is sealed to the bottom 16 and to the two side walls 18. The trough may have one or more transverse walls (not shown) at locations intermediate the trough ends. The walls may be formed from plate steel or from sheet steel. The walls may be reinforced by folding, rolling or welding a rim or lip along the side, bottom and top edges of the walls.

The side walls 18 are restrained from moving outward, away from the longitudinal centreline of the trough and are held upright, in part by tension in the restraint 14. The portions of the side walls cantilevered above the restraints are held upright in part by the semi-rigidity of the resilient sheet.

A line 28 extending longitudinally of the trough is suspended between a pair of upright supports 29; one support being located at each end of the trough body. The line is preferably an electrical conductor, such as a conductive line, tape or wire. The conductor is electrically insulated from the trough body by sitting each upright support 29 in an electrically insulating sleeve 31 which sits in a vertical, or at least upright, steel tube 33 which is attached, for example by welding, to the respective end wall 27.

The electrical conductor line 28 and the upright supports 29 are electrically activated, for example by connection to an electric fence energiser (not shown), to provide an active deterrent by electrically shocking animals coming into contact with the line or uprights. By electrically insulating the uprights from the trough end walls, and by electrically activating the uprights, animals having access to the rough are deterred from rubbing against the uprights. Animals already familiar with electric fencing may be visually deterred by a non-electrified line.

The height of the line or electrical conductor is selected to allow animals to feed from the trough but deter the animals from walking or trampling on or over the trough or the feed material in the trough. This arrangement reduces wastage and spoilage of the feed material which is generally contained within the trough in an unspoiled and uncontaminated condition until consumed by the feeding animals.

In the embodiment shown in FIG. 1, the trough body is reinforced by ribs 30. Preferably each pair of the side legs 24 is attached to a respective rib 30. Each rib extends at least part way down one trough side wall, across the bottom or floor of the trough, and at least part way up the other side wall.

In the embodiment shown in FIG. 1, a pair of exterior and interior ribs are secured together through the sheet to sandwiching the trough side walls and floor between them. The exterior ribs extend around the exterior faces of the side walls, and across the trough body underneath the bottom or floor. The interior ribs extend down the interior faces of the side walls and extending across the inside floor surface of the trough body. Preferably, as shown in FIG. 1, each rib 30 extends from the upper edge of one side wall to the upper edge of the other side wall.

The ribs 30 may be intermediate the ends of the trough, particularly when providing a reinforced attachment for the side legs 24. The ribs 30 may also be located at the ends of the trough to reinforce the attachment of the ends walls 27 to the resilient semi-rigid sheet or sheets forming the trough body.

Figure 2:
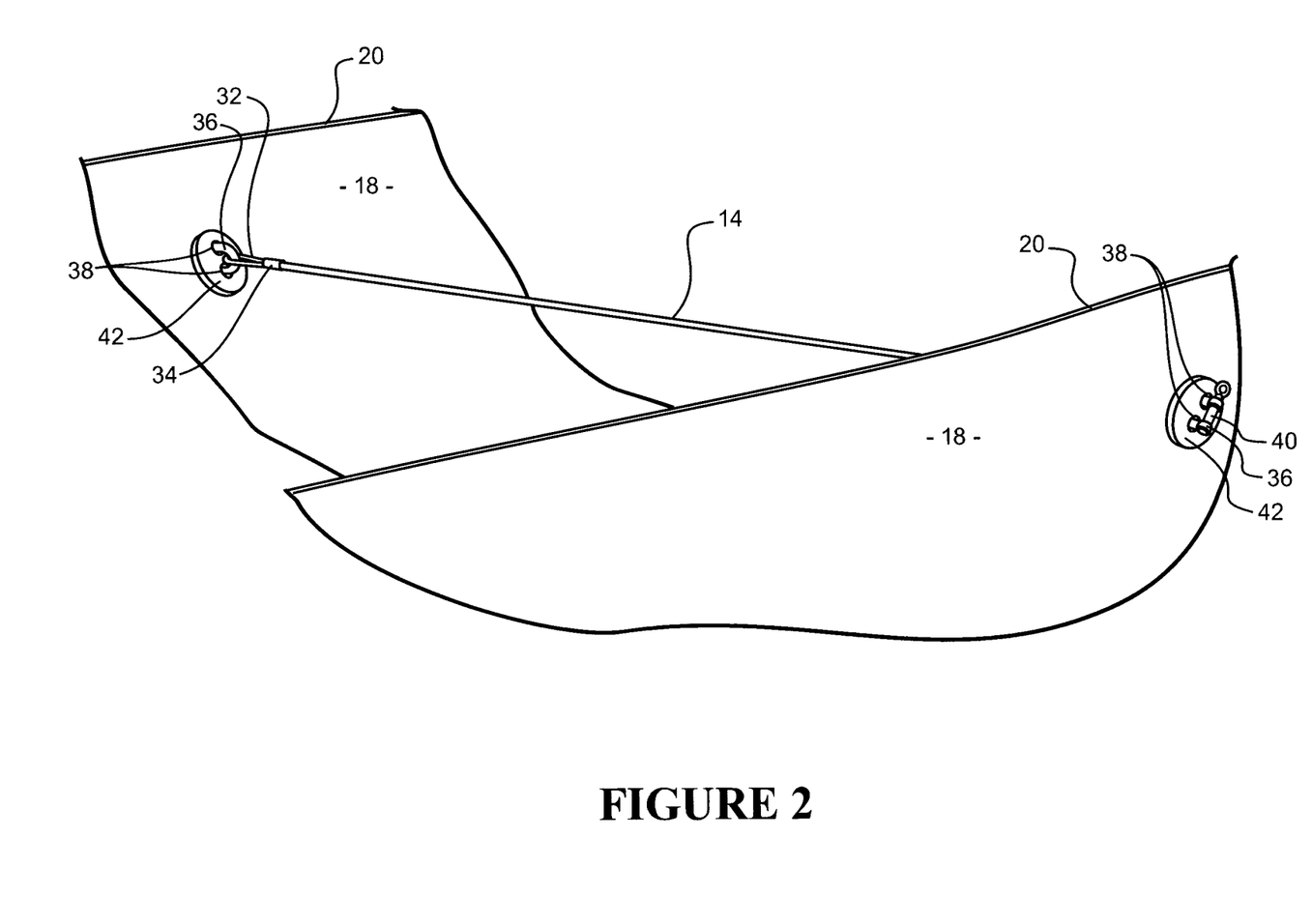
FIG. 2 shows a partial perspective view showing details of a transverse restraint attached to opposite side walls of the trough shown in FIG. 1.

FIG. 2 shows details of the restraints 14 of the first embodiment shown in FIG. 1. Each restraint is a length of wire with an eye 32 formed at each end. The eye is preferably formed by folding the end of the wire back on itself to shape the eye, and by then securing the eye with a crimp lug 34. A metal thimble (not shown) may be added to reinforce the eye. The eye is fastened to the trough side wall by a D-shackle 36. The shackle is looped through the eye and the distal ends of the two limbs of the shackle are passed through respective apertures in the side wall and secured there by the threaded shackle pin 40.

The fastening of the restraint to the trough side walls may be reinforced by passing the distal ends of the two limbs of the shackle through respective apertures 38 in one or more reinforcing pads or discs 42. These pads or discs may be located at either or both of the inside or outside faces of the respective side walls, and may be bonded to the respective faces of the respective side wall, for example by adhesive or by heat fusion welding.

Where several transverse restraints are to be used, transversely aligned pairs of apertures are provided in the respective side walls for fastening the outer ends of each restraint using the D-shackles. These apertures are provided as pairs of perforations distributed along the length of the trough, the perforation being lower than the upper edges of the side walls but higher than the floor or bottom of the trough. The perforations in one side wall are respectively aligned transversely across the trough with corresponding perforations in the opposite side wall.

The body of the trough shown in FIG. 1 has a substantially U-shaped or semi-cylindrical cross-sectional shape formed by rolling or curving the resilient semi-rigid sheet or sheets to form the wall and floor portions of the trough body.

Figure 3:
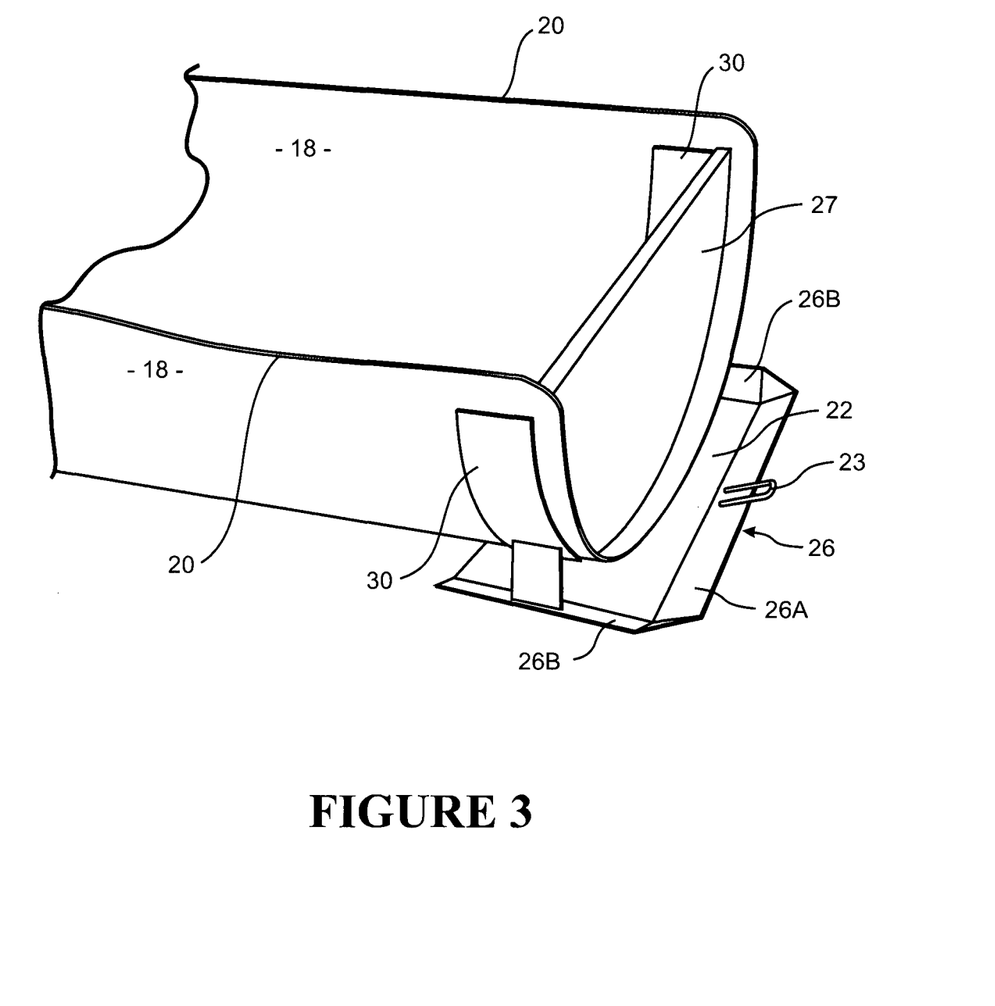
FIG. 3 shows a perspective view of a front end portion of a second embodiment of a trough according to the present invention.

FIG. 3 shows a perspective view of an end portion of a second embodiment of a trough according to the present invention. This trough is similar to trough 10 shown in FIG. 1 but omits the line 28 and upright supports 29. The end wall 27, reinforcing rib 30 and foot plate 22 as described above and shown in FIG. 1, may be seen in further detail in FIG. 3.

Figure 4:
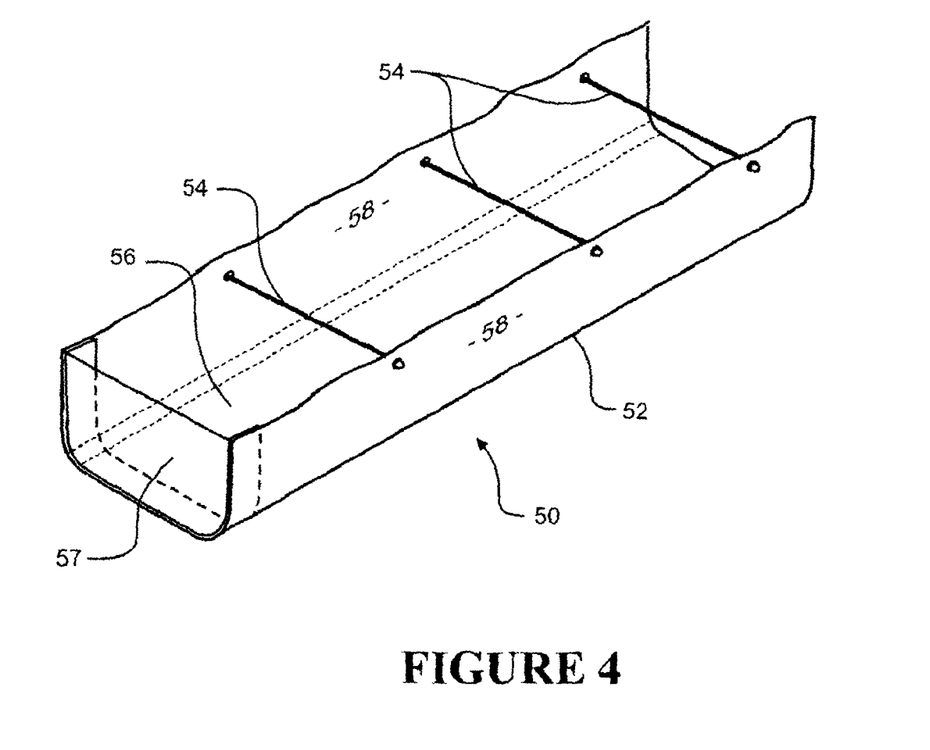
FIG. 4 shows a perspective view of a third embodiment of a trough according to the present invention.

FIG. 4 shows a perspective view of a third embodiment of a trough 50 according to the present invention. The trough is elongate and comprises an elongate trough body 52, and at least one transverse restraint 54.

The trough body 52 is formed from by folding at least one resilient semi-rigid sheet along two substantially parallel longitudinal lines to form a substantially flat floor or bottom 56 and two side walls 58 of the trough. The side walls may be substantially flat and the fold may be a radiused curve, as shown in FIG. 3.

The side walls are held upright in part by tension in the restraint. The portion of the side walls cantilevered above the restraints is held upright in part by the semi-rigidity of the resilient sheet. A transverse wall 57 may be fitted at one or both ends of the trough or at locations intermediate the trough ends. The walls may be held upright in part by these transverse walls.

The sheet may be provided with lines of weakness about which the sheet preferentially bends when the side wall portions of the sheet are made non-planar with the floor or bottom portion to form the trough body. Each line of weakness may be a crease or a line of perforations formed in the sheet.

The flat floor or bottom 56 provides support for maintaining the trough of FIG. 3 upright. In other respects the trough shown in FIG. 3 can incorporate features similar to those described above with reference to the trough embodiment shown in FIG. 1. For example, the trough of FIG. 3 does not include a foot plate or side legs, but these can be incorporated if required. Furthermore, a foot plate can be fitted at a front end of the trough to provide a leading edge skid for facilitating the towing of the trough over a ground surface.

Figure 5:
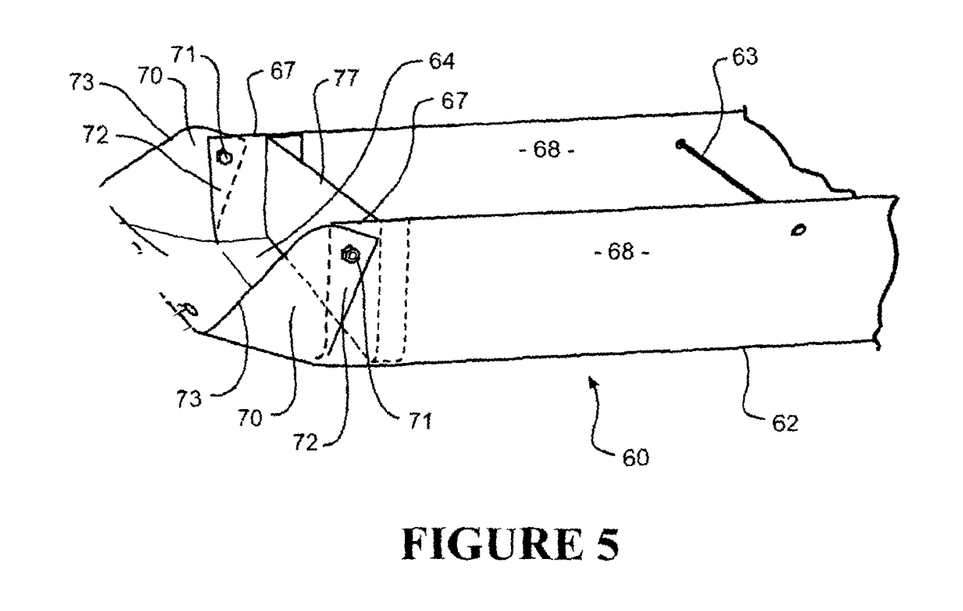
FIG. 5 shows a perspective view of a front end portion of a fourth embodiment of a trough according to the present invention.

FIG. 5 shows a perspective view of a fourth embodiment of a trough 60 according to the present invention. The trough is elongate and comprises an elongate trough body 62, and at least one transverse restraint 63.

The trough has flat bottom or floor 64 and the trough body 62 has features similar to those described above with reference to the embodiment shown in FIG. 3, with the additional feature of an integral front end skid 65 that can be formed from the resilient semi-rigid sheet integrally with the front end portions of the floor or bottom, and side walls, of the trough.

The front end skid 65 is formed by making two mutually-aligned transverse slots or cuts through the resilient semi-rigid sheet at the front end of the trough body 62. The cuts extend downward from the upper edges 67 of each respective side wall 68 of the trough body and around a curved portion of the sheet where the wall 68 meets the floor 64. The cuts do not extend across the floor or bottom of the trough body. The floor or bottom portion of the sheet in front of the transverse cuts is tilted upward to form the sole 69 of the skid. This tilting action also tilts side wall portions or flanges 70 at the front end of the sheet upward and backward to partially overlap with the front ends of the trough side walls 68. Fasteners 71 secure the overlapping portions 72 of the flanges 70 and respective walls 68 at each side of the skid. The corners 73 of the sheet at the upper edges of the flanges may be trimmed diagonally to streamline the upper side edges of the sheet at the forward end of trough.

One or more towing eyes or apertures 74 are formed adjacent the leading edge 75 of the skid sole for attachment to a rear end of a towing line or chain 76. The front end of the towing chain or line may be attached to a towing vehicle (not shown) for towing the mobile trough from location to location.

A front end wall 77 may be fitted, and optionally sealed, to the front end of the trough and may be aligned (not shown) with the transverse slots or cuts in the sheet, or may be placed slightly behind the cuts, as shown in FIG. 4.

The trough body is preferably made from one or more sheets of a plastics material. The sheet, or each sheet, is laid out on a floor or ground surface and folded, bent or curved along the longitudinal centreline, or along two spaced and generally parallel lines, to form both trough side walls integrally with the trough floor. Where a trough longer than the length of a single sheet is required, multiple sheets may be joined together, end to end, to form the longer trough body.

The trough side walls are maintained upright at least in part by tension in the transverse restraints and in part by the resilient semi-rigidity of the sheet, or sheets.

If pressure is applied to the outer face of a side wall, for example by an animal feeding at the trough, the resilient side walls can deform and bend inward temporarily at least at the locality of the applied pressure. The transverse restraints are preferably flexible so that they too can flex under pressure applied to the outer face of a side wall. The side wall and the restraints return to their original forms, in part by the resilience of the sheet material of the side wall.

The sheet material is preferably a resilient, semi-rigid plastics material such as a heavy duty polyethylene, polythene or polypropylene. The trough side walls may be biased to push outwards against the support wires by the inherent resilience, or 'memory', of the sheet material. The rigidity of the sheet material is sufficient so that the upper edge portion of the upright side walls, which is cantilevered above the restraints, is maintained substantially upright. In currently preferred embodiments, the trough body is a polyethylene or polypropylene plastics sheet material with a thickness of more than 4 mm, and preferably 6 mm or more. However, the invention is not limited to troughs having bodies made from the above-mentioned sheet plastics materials and sheet thicknesses.

The trough may be perforated with drainage holes (not shown in the figures) to allow rain water or other liquids to readily drain from the trough. However, it is envisaged that the opposite ends may be closed by end walls to make the troughs water tight for containment of water, molasses or other liquid feed materials.

The freestanding troughs according to the invention may incorporate intermediate transverse walls (not shown), similar to the end walls described above, to subdivide a trough into distinct compartments for separation of different feed materials, for example food and water.

The freestanding troughs according to the invention may incorporate a skid plate at each end of the trough so that the trough may be readily towed in either direction.

The foregoing describes the invention with reference to preferred embodiments. Alterations and modifications as will be obvious to those skilled in the art are intended to be incorporated within the scope of the invention as defined in the accompanying claims. The disclosures and the descriptions herein are purely illustrative and are not intended to be in any sense limiting.

The invention claimed is:

1. A freestanding trough comprising an elongate trough body and at least one restraint, wherein:
   the trough body comprises a bottom portion and two side wall portions;
   the bottom portion is integrally formed with the two side wall portions from a resilient semi-rigid sheet;
   the at least one restraint extends transversely across the inside of the trough, intermediate the ends of the trough body, lower than upper edges of the side wall portions but higher than the bottom portion, the at least one restraint comprising a flexible wire;
   the side wall portions are secured respectively to opposite ends of the at least one restraint;
   the side wall portions are restrained from moving outward, away from a longitudinal centerline of the trough, at least in part by a tension in the at least one restraint;
   the side wall portions are maintained upright in part by the tension in the at least one restraint, and in part by the resilient semi-rigidity of the sheet;
   the trough body and the at least one restraint are arranged such that the trough can rest in a stable upright original resting position without being attached or tethered to an underlying floor surface on which the trough rests;
   wherein the trough body and the at least one restraint when in the original resting position are sufficiently flexible so that when a pressure is applied to an outer face of one of the two side wall portions of the trough body at the at least one restraint, the side wall portion deforms and bends inwardly at least at the locality of the applied pressure and the at least one restraint bends and when the applied pressure is removed, the one of the two side wall portions resiliently rebounds so that the trough body and the at least one restraint return to the original resting position.

2. A freestanding trough as claimed in claim 1, wherein the trough comprises a foot at a one end of the trough body, the foot extending outwardly from the longitudinal centerline, at each side of the trough.

3. A freestanding trough as claimed in claim 2, wherein the foot comprises a flat plate which extends under the one end of the trough body.

4. A freestanding trough as claimed in claim 3, wherein the one end is a front end of the trough body, and the foot comprises an extension which extends upwardly and forwardly from a front edge of the flat plate.

5. A freestanding trough as claimed in claim 4, wherein the extension extends upwardly and outwardly from opposite side edges of the flat plate.

6. A freestanding trough as claimed in claim 2, comprising at least one reinforcing rib which is attached to the foot and to at least one of the side wall portions.

7. A freestanding trough as claimed in claim 6, wherein the rib extends across the bottom portion and up to the upper edge of each side wall portion.

8. A freestanding trough as claimed in claim 1, wherein the trough comprises at least one leg attached to each of the longitudinal sides of the trough, each of the at least one leg being intermediate the ends of the trough.

9. A freestanding trough as claimed in claim 1, wherein the bottom portion is substantially flat.

10. A freestanding trough as claimed in claim 9, wherein a skid plate extends upwardly and forwardly from a front end of the substantially flat bottom portion.

11. A freestanding trough as claimed in claim 10, wherein the skid plate is supported by two flanges that are respectively attached to the side wall portions of the trough body.

12. A freestanding trough as claimed in claim 11, wherein the skid plate and the flanges are formed integrally with the trough body from the resilient semi-rigid sheet.

13. A freestanding trough as claimed in claim 1, comprising a line that extends longitudinally of the trough, from above one end of the trough body to above the other end of the trough body.

14. A freestanding trough as claimed in claim 13, wherein the line is electrically conductive and insulated from other parts of the trough.

15. A freestanding trough as claimed in claim 13, wherein the line is supported at its ends by suspension from uprights at each end of the trough body.

16. A freestanding trough as claimed in claim 15, wherein the line and the uprights are electrically conductive and insulated from other parts of the trough.

17. A freestanding trough as claimed in claim 15, wherein the trough comprises an end wall at each end of the trough body and the uprights are supported respectively by the end walls.

18. A freestanding trough as claimed in claim 17, wherein each end wall is sealed to the bottom portion and two side wall portions.

19. A freestanding trough as claimed in claim 1, wherein the trough comprises an end wall at each end of the trough body.

20. A freestanding trough as claimed in claim 1, wherein the sheet is provided with lines of weakness about which the sheet preferentially bends when the side wall portions are made non-planar with the bottom portion to form the trough body.

21. A freestanding trough as claimed in claim 20, wherein the sheet is creased to provide the lines of weakness.

22. A freestanding trough as claimed in claim 20, wherein the sheet is provided with perforations along the lines of weakness.

23. A freestanding trough as claimed in claim 1, comprising at least one reinforcing rib, intermediate the ends of the trough, the rib extending across the bottom portion and at least part way up each side wall portion.

24. A freestanding trough as claimed in claim 23, wherein the rib extends across the bottom portion and up to the upper edge of each side wall portion.

25. A freestanding trough as claimed in claim 1, wherein the at least one restraint is elongate.

26. A freestanding trough as claimed in claim 25, wherein the ends of the at least one restraint are shackled respectively to the side wall portions.

27. A freestanding trough as claimed in claim 1, wherein:
   each side wall portion has perforations which are distributed along the length of the trough, the perforations being lower than upper edges of the side wall portions but higher than the bottom portion;
   the perforations in one side wall portion are respectively aligned transversely across the trough with corresponding perforations in the opposite side wall portion; and
   a plurality of restraints is located substantially inside the trough with opposite ends of each restraint connecting respectively to the side wall portions at the transversely aligned perforations.

28. A freestanding trough as claimed in claim 1, wherein the sheet is made of a plastic material.

29. A freestanding trough as claimed in claim 28, wherein the plastic material is a polypropylene.

30. A freestanding trough as claimed in claim 1, wherein the sheet has a thickness of at least 4 mm.

* * * * *